United States Patent
Shovman et al.

(10) Patent No.: US 12,013,977 B2
(45) Date of Patent: Jun. 18, 2024

(54) SYSTEM AND METHOD FOR SOCIALLY RELEVANT USER ENGAGEMENT INDICATOR IN AUGMENTED REALITY DEVICES

(71) Applicant: EyeWay Vision Ltd., Or Yehuda (IL)

(72) Inventors: Mark Shovman, Ariel (IL); Doron Terre, Tel Aviv (IL); Ilya Rabinovich, Tel Aviv (IL); Boris Greenberg, Tel Aviv (IL)

(73) Assignee: VOXELSENSORS SRL, Brussels (BE)

( * ) Notice: Subject to any disclaimer, the term of this patent is extended or adjusted under 35 U.S.C. 154(b) by 12 days.

(21) Appl. No.: 17/607,655

(22) PCT Filed: Apr. 26, 2020

(86) PCT No.: PCT/IL2020/050469
§ 371 (c)(1),
(2) Date: Oct. 29, 2021

(87) PCT Pub. No.: WO2020/222228
PCT Pub. Date: Nov. 5, 2020

(65) Prior Publication Data
US 2022/0197379 A1    Jun. 23, 2022

(30) Foreign Application Priority Data
Apr. 29, 2019    (IL) .......................................... 266333

(51) Int. Cl.
*G06F 3/01* (2006.01)
*G02B 27/01* (2006.01)
(Continued)

(52) U.S. Cl.
CPC ............ *G06F 3/011* (2013.01); *G02B 27/017* (2013.01); *G02B 27/0172* (2013.01);
(Continued)

(58) Field of Classification Search
None
See application file for complete search history.

(56) References Cited

U.S. PATENT DOCUMENTS

| 8,531,590 B2 | 9/2013 | Naimark | |
| 2015/0350848 A1 * | 12/2015 | Eramian | ............... H04W 4/029 |
| | | | 455/404.2 |

(Continued)

FOREIGN PATENT DOCUMENTS

| CN | 108604175 A | | 9/2018 | |
| CN | 109154861 A | | 1/2019 | |
| CN | 111084710 A | * | 5/2020 | ............. A61H 3/061 |

OTHER PUBLICATIONS

Chinese Search Report issued with the Office Action dated Nov. 3, 2023 for the corresponding Chinese patent application No. 2020800365786.

*Primary Examiner* — Jwalant Amin
(74) *Attorney, Agent, or Firm* — Kenealy Vaidya LLP (57) ABSTRACT

Some embodiments of the presently disclosed subject matter are directed to an indicator device of user activity in Augmented Reality (AR). The indicator device comprises an indicator module being configured and operable to generate at least one signal being indicative of at least one social relevant parameter related to the user activity to at least one user's onlooker, and a monitoring module connectable to the indicator module and being configured and operable to receive and process data related to user activity, determine whether the user is in a certain condition corresponding to a certain social relevant parameter, and activate the indicator module upon identification of the certain user condition.

16 Claims, 3 Drawing Sheets

(51) Int. Cl.
*G06T 19/00* (2011.01)
*G06V 20/20* (2022.01)
(52) U.S. Cl.
CPC .............. *G06F 3/013* (2013.01); *G06F 3/016* (2013.01); *G06T 19/006* (2013.01); *G06V 20/20* (2022.01); *G02B 2027/014* (2013.01); *G02B 2027/0178* (2013.01); *G06T 2219/024* (2013.01)

(56) References Cited

U.S. PATENT DOCUMENTS

| | | | |
|---|---|---|---|
| 2016/0189391 A1* | 6/2016 | Demartin | G08B 13/19602 382/103 |
| 2017/0364153 A1 | 12/2017 | Kazansky et al. | |
| 2018/0276957 A1* | 9/2018 | Ibrahim | H04R 1/10 |

* cited by examiner

SYSTEM AND METHOD FOR SOCIALLY RELEVANT USER ENGAGEMENT INDICATOR IN AUGMENTED REALITY DEVICES

CROSS REFERENCE TO RELATED APPLICATION(S)

This application is a national phase filing under 35 C.F.R. § 371 of and claims priority to PCT Patent Application No. PCT/IL2020/050469, filed on Apr. 26, 2020, which claims the priority benefit under 35 U.S.C. § 119 of Israeli Application No. 266333 filed on Apr. 29, 2019, the contents of each of which are hereby incorporated by reference in their entireties.

BACKGROUND

Some embodiments of the presently disclosed subject matter is in the field of wearable/head mounted image projection systems adapted for projecting images to a user eye(s) for providing an experience of augmented or virtual reality to users. More specifically, it relates to a technique for user engagement indicator for augmented reality (AR).

Background Art

A related art reference considered to be relevant as background to the presently disclosed subject matter is listed below:
U.S. Pat. No. 8,531,590
Acknowledgement of the above reference herein is not to be inferred as meaning that it is in any way relevant to the patentability of the presently disclosed subject matter.

Background

Head mounted or otherwise wearable image projection systems for projecting virtual and/or augmented virtual reality to a user eye(s) are becoming increasingly popular. Such systems are in many cases configured as glasses mountable onto a user's head and operable for projecting images to the user's eyes for providing virtual reality image/video projection to the user. To this end, certain of the known systems are aimed at providing pure virtual reality image projections to the user eyes, in which light from the external scenery is blocked from reaching the eye(s). Other systems are directed to provide augmented virtual reality perception, in which the light from the external scenery is allowed to pass to the eyes, while also being augmented/superposed by images/video frames projected to the eyes by the image projection systems.

Augmented Reality (AR) provides an instant, ubiquitous and discreet access to digital content, as well as easy and intuitive collaboration on it. Therefore, wearable AR devices become more widely adopted. However, a person (or several people) interacting with virtual content that is invisible to others in a public or social setting can create socially uncomfortable situations. This is in contrast with the currently common situations where the common visibility of objects that are interacted with (e.g. book, laptop, smartphone, headphones), and the clearly visible focus of the user on them (gaze pointed at screen, ears obstructed by headphones etc.) provide clear indication to onlookers as to what the user is interacting with.

General Description

There is a need in the art to provide a technique being capable of avoiding such uncomfortable situations. To this end, some embodiments of the presently disclosed subject matter provides a new technique for an AR user engagement indicator. This can be implemented by using external indicator(s) being configured and operable to show (i.e. clearly signal) to the onlooker(s) socially relevant information about the user activity in AR. Although, throughout the following description, the term "onlooker" is used in a single form, the number of persons being in the user's environment is not a part of the invention and the invention is not limited to any number of onlookers. The engagement indicator device is thus operable to indicate to the surroundings whether the user engagement/attention is given to real or virtual content provided to him via the AR system.

Therefore, according to a broad aspect of some embodiments of the presently disclosed subject matter, there is provided an indicator device of user activity in Augmented Reality (AR). The indicator device includes an indicator module being configured and operable to generate at least one signal being indicative of at least one social relevant parameter related to the user activity to at least one user's onlooker, and a monitoring module connectable to the indicator module and being configured and operable to receive and process data related to user activity, determine whether the user is in a certain condition corresponding to a certain social relevant parameter, and activate the indicator module upon identification of the certain user condition. Data related to user activity may include data indicative of current user activity and/or reference data patterns indicative of at least one user activity and/or data being indicative of virtual content presented to the user and/or data related to the current real-world environment of the user and/or data indicative of the gaze direction of the user over time. The indicator device may be a stand-alone device or may be configured to be integrated in any wearable Augmented/Virtual Reality system. For example, the indicator device may be a complete and separate subsystem aimed at providing information to the onlookers. A head mounted or otherwise wearable image projection system may be used with the novel indicator device of some embodiments of the presently disclosed subject matter projecting virtual and/or augmented virtual reality to the user eye(s). Such systems may be configured as glasses mountable onto a user's head. The invention is not limited to the use of pure virtual reality image projections to the user eyes, in which light from external scenery is blocked from reaching the eye(s). The invention is also not limited to the use of augmented virtual reality perception, in which light from the external scenery is allowed to pass to the eyes while also being augmented/superposed by images/video frames projected to the eyes by the image projection systems.

The social relevant parameter may be a recording activity and/or an immersion condition and/or a focusing condition and/or a space activity. The indicator module may be a visual indicator module and/or an auditory indicator module.

In some embodiments, the indicator module is operable in at least one of on/off, gradual operating mode and operating mode being indicative of a certain social parameter. The gradual operating mode may be indicative of a level of user condition.

In some embodiments, the monitoring module is configured and operable to process the data related to user activity to determine a certain user condition.

In some embodiments, the monitoring module is configured and operable to process data indicative of current user activity to determine the recording activity of the user.

In some embodiments, the monitoring module is configured and operable to receive data being indicative of temporal patterns of the gaze direction of the user, process the data to identify a certain pattern, compare the identified pattern with one or more reference patterns indicative of at least one user activity to determine a matching pattern, and upon determining the matching pattern, activate the indicator module accordingly.

In some embodiments, the monitoring module is configured and operable to identify a correspondence between 3D position of the virtual content and the gaze direction of the user.

In some embodiments, the indicator module is configured and operable to generate a plurality of signals, each being indicative of different types of user activities.

According to another broad aspect of some embodiments of the presently disclosed subject matter, there is provided a method for indicating AR user activity. The method includes receiving and processing data related to user activity; identifying whether the user is in a certain user condition corresponding to a certain social relevant parameter; and generating at least one signal being indicative of at least one social relevant parameter related to a user activity, to an onlooker. The procedure of generating the signal may include activating at least one of the following operating modes: on/off, gradual and operating mode being indicative of a specific social parameter. This may be implemented by generating visual or auditory signal(s).

In some embodiments, the method further includes activating an indicator device upon identification of a certain user condition.

In some embodiments, the method further includes determining the type of user activity.

In some embodiments, the method further includes generating at least one signal being indicative of the type of user activity.

In some embodiments, processing data indicative of virtual content presented to the user includes determining an amount of user's field of view obstructed by virtual content.

In some embodiments, the processing procedure includes identifying in the data a certain pattern, comparing the identified pattern with one or more reference patterns indicative of at least one user activity to determine a matching pattern, and, upon determining the matching pattern, generating at least one signal corresponding to a certain social parameter.

In some embodiments, the processing procedure includes anticipating extent of user movement based on the data being indicative of virtual content presented to the user to determine a space condition being related to an activity that may cause the user to suddenly move without awareness of their surroundings referred hereinafter as "space activity", and on reference data patterns indicative of at least one user activity.

In some embodiments, the processing procedure includes identifying a correspondence between 3D position of the virtual content and the gaze direction of the user.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Some embodiments of the presently disclosed subject matter is aimed at preventing social embarrassing situations related to the use of AR activity. The following are examples of use cases where an unclear AR activity leads to a social faux pas (in all these, Alice has her AR glasses on; Bob does not):

Alice and Bob attend a party; Alice is looking at Bob and simultaneously chats online with her friend. Bob is concerned because he thinks that Alice might be taking pictures of him and posting them online, but is too polite to ask.

Bob greets Alice, but she does not react, despite looking straight at Bob. Bob is confused; in fact, Alice does not see nor hear him at all, because she is watching a concert in AR, and it completely occludes her vision.

On a train, Alice stares intently at Bob's chest; Bob is confused and slightly unnerved. In fact, Alice is checking her emails, and the email widget happens to be on the line of sight of Bob's chest.

Alice and Bob are talking; Alice glances every now and again at the door; every time she does that, Bob automatically looks there as well, expecting someone to come in; in fact, Alice is reading the messages she receives from her sister.

The comfortable form-factor of AR devices enables to wear them even when they are not actively used (in contrast with, e.g. headphones nowadays). Therefore, the social message related when using headphones of "I visibly have headphones on; therefore, I cannot hear you" cannot be translated onto "I have AR glasses on; therefore, I cannot see you". In addition, the social implications of minimal AR heads-up display (e.g. a timepiece at the edge of someone's vision) are very different from a fully immersive surround experience that essentially leaves the user blind to the outside world. Some embodiments of the presently disclosed subject matter solves both these needs. In order to avoid the unpleasantness situations described in the above examples, some embodiments of the presently disclosed subject matter allows to the AR device to clearly signal to onlookers, socially relevant information on the user AR activity, yet without compromising the user's privacy.

Figure 1:
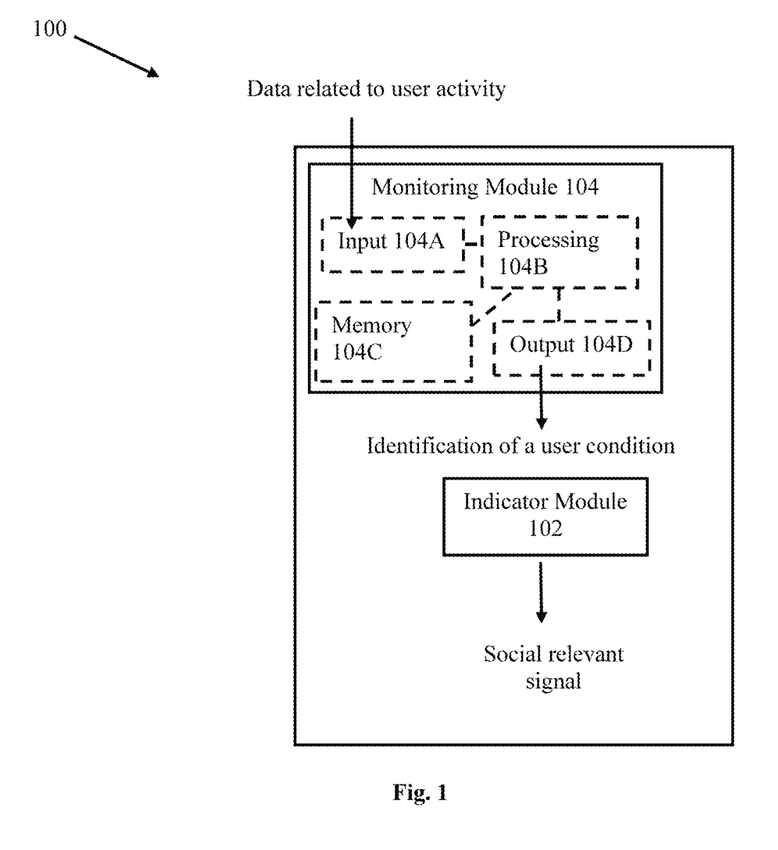
FIG. 1 is a schematic block diagram illustrating the main functional elements of the device of some embodiments of the presently disclosed subject matter.

Reference is made to FIG. 1, illustrating by the way of a block diagram, an indicator device of user activity in Augmented/Virtual Reality (AR). The indicator device is configured for reflecting a user activity in a user's AR device. The "AR device" generally refers to a device being capable of displaying visual content that can be only visible to its user, e.g. smart glasses. The indicator device 100 includes one or more indicator modules 102 being configured and operable to generate at least one signal (e.g. visual or auditory signal) being indicative of at least one social relevant parameter related to the user activity to at least one user's onlooker and a monitoring module 104 connectable to the indicator module 102 and being configured and operable to receive and process data related to user activity, determine whether the user is in a certain condition corresponding to a certain social relevant parameter, and activate the indicator module upon identification of the certain user condition.

Data related to user activity may include data indicative of current user activity and/or reference data patterns indicative of at least one user activity and/or data being indicative of virtual content presented to the user and/or data related to current real-world environment of the user and/or data indicative of the gaze direction of the user over time. Condition of the user refers to a situation in which the user interacts with an AR content (e.g. identification of a presence, type and 3D position of an AR content) and cannot interact with the environment and/or a situation in which the user performs a certain activity and/or a situation in which the user interacts with an AR content at a certain level of engagement. The certain activity includes recording activity and engagement in a "space activity". The certain level of engagement includes a certain level threshold when interacting with any AR content (e.g. time duration, volume or field or view).

In this connection, it should be understood that monitoring module 104 receives a certain data and processes this data in different ways in order to identify different problematic social relevant parameters. The social relevant parameters refer to different types of information communicated to the onlookers via different signals. They may be indicative of a recording activity and/or an immersion condition and/or a focusing condition and/or a space activity. Indicator module 102 generates at least one notification signal being indicative of a social relevant parameter.

More specifically, the recording activity informs the environment that the user is recording audio, video or images for personal use, disregarding the continuous ongoing recording done for the sake of normal device functioning (listening for voice commands, visual positioning etc.). In this way, upon activation of the recording signal, the onlooker is aware that, if he is placed in the user's field of view, the user records data on which he appears. If desired, the onlooker should move from the user's field of view to not appear in the frame, or communicate with the user. Conversely, if the recording signal is off (i.e. not on), the onlooker can reasonably assume that he is not being recorded. Each of monitoring module 104 and indicator module 102 may include a communication utility to send and receive the notification data respectively. More specifically, monitoring module 104 processes data related to currently running applications available to the operating system (e.g. their permissions) and determines whether the recording condition is identified (i.e. whether there is a 'recording for personal use' going on). In some embodiments, the recording signal is the strongest signal, visible even from the periphery, because it communicates voluntary privacy intrusion on the part of the user. For example, a blinking red light, that is highly visible and attention grabbing, is used.

The immersion condition informs the environment that the user's senses are taken up by digital content. The immersion signal may come next the recording signal in order of importance. It needs to be visible to onlooker(s) desiring to establish communication with the user. For example, for activating the immersion condition, the monitoring module may proceed as follows: receiving and processing AR content data and user location data to determine how much of the user's field of view is obscured by AR content; upon identification of a certain threshold (e.g. 50%) of the obscured user's field of view, activating the indicator module. In some embodiments, the immersion condition may be displayed in a scale manner being indicative of how much of the user's senses (vision and hearing separately) are taken up by digital content, or how immersed a user is in AR, or conversely, how much the user is aware of their real-world surroundings. In this way, upon activation of the immersion condition signal, the onlooker is aware that the user is partially, or not aware, of the real world surrounding him. For example, the gradual scale enables to distinguish between 'no AR', 'a bit of AR', 'almost full immersion' and 'full VR'. A plurality of light modules may be successively activated corresponding to a different amount of obscured user's field of view.

The focusing condition informs the environment that the user is currently focused on, or interacting with, virtual content. In this way, upon activation of the focusing condition signal, the onlooker is aware that the user is occupied and would not be attentive to any interaction with the environment, even if his field of view is not obstructed by the virtual content. The focusing condition may be more subtle than the recording activity and the immersion condition. The focusing condition may be used when the user and the onlooker are already in a communication, or to prevent miscommunication between them. For example, to activate the focusing condition signal, the monitoring module may proceed as follows: receiving and processing eye tracking data to determine gaze direction and 3D gaze point; receiving and processing data from world mapping in conjunction with AR content data to determine what the user is looking at; if the user is looking at an AR content, performing an eye-movement pattern analysis to infer user type of activity and context; determining whether the user is currently actively engaged with the AR content he is looking at; upon identification of the current active engagement of the user with the AR content, activating the indicator module.

The space activity informs the onlookers that the user is engaged in an activity that may cause them to suddenly move without awareness of their surroundings. In this way, upon activation of the space activity signal, the onlooker is warned that the user may suddenly move. In some embodiments, the space signal is the strongest signal, perceivable even from the periphery, because it communicates possible physical harm from the user to the onlooker.

Indicator module 102 generates at least one signal being perceivable (e.g. visible or audible) by person(s) being different from the user without need for special equipment. More specifically, indicator module 102 may include a plurality of different light modules generating different signals or one light module (e.g. small LED(s)) generating different light signals. The signals may be of different colors and/or may be displayed by units having different designs (e.g. shapes) and/or may be binary (on/off) and/or may be of different intensity (e.g. brightness). If the signals are binary, they may have different frequencies (i.e. different on/off periods). Additionally, or alternatively, the indicator module 102 may include a speaker generating an audible sound signal. The different elements of the device communicate with each other and may not be placed in the same environment. Each signal is indicative of a different social parameter identifiable by the onlookers. Additionally, the signals may be indicative of different types of activity (e.g. listening to music, watching video, talking to someone). For example, a specific color may be associated with a specific type of activity. The different signals may be gradual according to the level of user condition. To this end, monitoring module 104 processes the received data to determine a proportion of the field of view occupied by the virtual activity. For example, in the immersion or focusing condition, the level of immersion or focusing may be identified and noticed by the onlookers.

In general, monitoring module 104 may be a processor, a controller, a microcontroller or any kind of integrated circuit. Monitoring module 104 is configured generally as a computing/electronic utility including inter alia such utilities as data input and output modules/utilities 104A and 104D, memory 104C (i.e. non-volatile computer readable medium), and analyzer/data processing utility 104B. The utilities of the monitoring module 104 may thus be implemented by suitable circuitry and/or by software and/or hardware components including computer readable code configured for implementing the identification of the user condition. The features of some embodiments of the presently disclosed subject matter may include a general-purpose or special-purpose computer system including various computer hardware components. Features within the scope of some embodiments of the presently disclosed subject matter also include computer-readable media for carrying out or having computer-executable instructions, computer-readable instructions, or data structures stored thereon. Such computer-readable media may be any available media, which are accessible by a general-purpose or special-purpose computer system. By way of example, without limitation, such computer-readable media can include physical storage media such as RAM, ROM, EPROM, flash disk, CD-ROM or other optical disk storage, magnetic disk storage or other magnetic storage devices, or any other media which can be used to carry or store desired program code in the form of computer-executable instructions, computer-readable instructions, or data structures and which may be accessed by a general-purpose or special-purpose computer system. Computer-readable media may include a computer program or computer application downloadable to the computer system over a network, such as a wide area network (WAN), e.g. Internet. In this description and in the following claims, a "monitoring module" is defined as one or more software modules, one or more hardware modules, or combinations thereof, which work together to perform operations on electronic data. For example, the definition of a processing utility includes the hardware components of a personal computer, as well as software modules, such as the operating system of a personal computer. The physical layout of the modules is not relevant. A computer system may include one or more computers coupled via a computer network. Likewise, a computer system may include a single physical device where internal modules (such as a memory and processor) work together to perform operations on electronic data. Monitoring module 104 may be included of a processor embedded therein running a computer program, or attached thereto. The computer program product may be embodied in one or more computer readable medium(s) having computer readable program code embodied thereon. The computer readable medium may be a computer readable signal medium or a computer readable storage medium. Computer program code for carrying out operations for aspects of some embodiments of the presently disclosed subject matter may be written in any combination of one or more programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). These computer program instructions may be provided to the processor of a general purpose computer, special purpose computer, or other programmable data processing apparatus to produce a machine, such that the instructions, which execute via the processor of the computer or other programmable data processing apparatus, can implement the functions/acts specified in the flowchart and/or block diagram block or blocks. The specified functions of the processor can be implemented by special purpose hardware-based systems that perform the specified functions or acts, or combinations of special purpose hardware and computer instructions.

Figure 3:
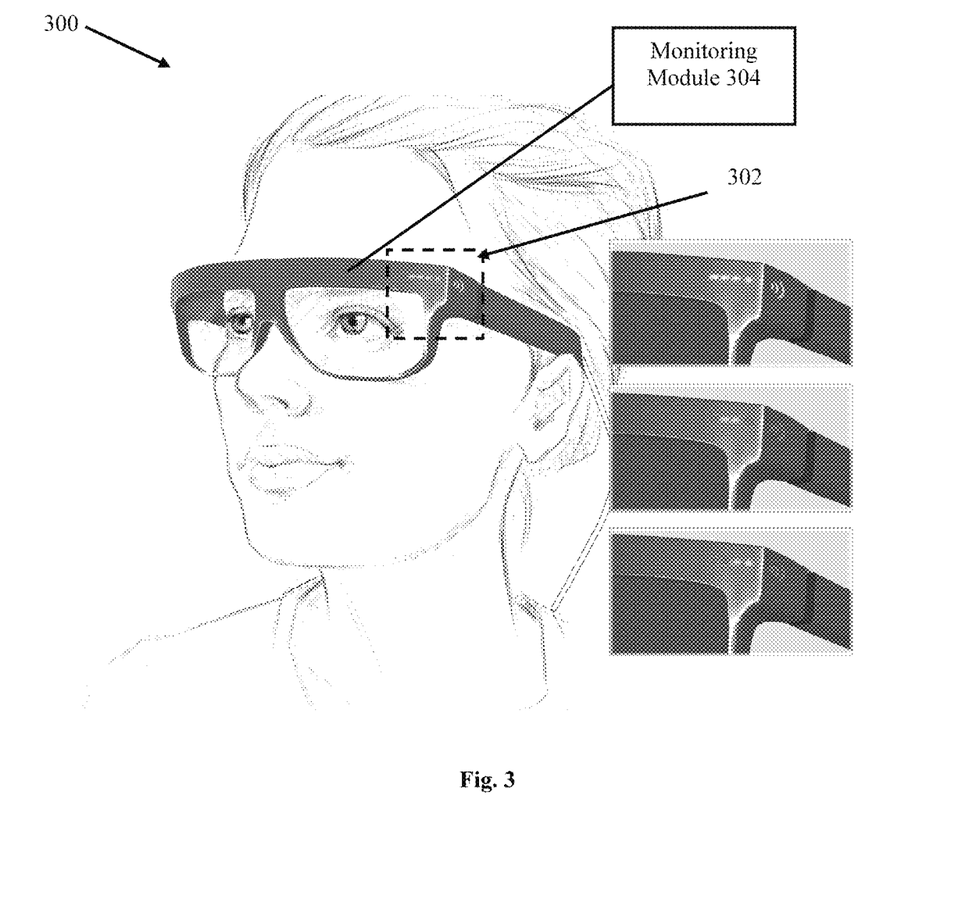
FIG. 3 is a possible illustration of a specific configuration of the device according to some embodiments of some embodiments of the presently disclosed subject matter.

The correspondence between the different signals and the different social relevant parameter may be predetermined according to the configured of the AR system to be used with the indicator device of some embodiments of the presently disclosed subject matter. Some examples of such correspondence are detailed below for example as illustrated in FIG. 3. For example, a table of correspondence between the different signals and the different social relevant parameters may be stored in a database. Such table may be stored in memory 104C. Alternatively, storage may be separate from the server(s) (e.g. SAN storage). If separate, the location(s) of the storage may be in one physical location, or in multiple locations and connected through any type of wired or wireless communication infrastructure. The database may rely on any kind of methodology or platform for storing digital data. The database may include for example, traditional SQL databases such as Oracle and MS SQL Server, file systems, Big Data, NoSQL, in-memory database appliances, parallel computing (e.g. Hadoop clusters), etc. If memory 104C is configured as the storage medium of the database, it may include any standard or proprietary storage medium, such as magnetic disks or tape, optical storage, semiconductor storage, etc.

Monitoring module 104 may be placed in the environment (e.g. being integrated in any desired devices) or, alternatively, a server not located in the proximity of the environment may perform receiving the data and/or identifying in the data a certain condition and sending a notification. The server is in data communication with the different parts of the device.

For example, to identify the recording activity, monitoring module 104 may receive and process recorded data of the user's surroundings to determine whether the user is recording the environment. Monitoring module 104 is configured to control whether a permission for recording this data exists, and upon identification of such permission, monitoring module 104 generates a recording signal to the onlookers and controls access and storage of this recorded data. Monitoring module 104 is thus configured to differentiate between data for the operating system use and data for personal use and provide permission to an application to record personal data together with an indication to the surroundings that the user is recording for his personal use. For example, to identify the immersion condition of the user, monitoring module 104 may receive and process data being indicative of virtual content presented to the user and determine (e.g. calculate) the amount of user's field of view obstructed by virtual content. If the amount of user's field of view obstructed by virtual content is above a certain threshold of amount, monitoring module 104 determines that the user is in an immersion condition.

For example, to identify the focusing condition, in addition to the gaze data, monitoring module 104 may receive and process data on virtual content currently presented to the user (e.g. what is shown and where), and current real-world environment of the user (e.g. what is there and where it is located relative to the user). Monitoring module 104 processes the received data to determine what the user is looking at (e.g. a real person, or a virtual window in the same gaze direction).

For example, to identify the space activity condition, monitoring module 104 may receive and process data on current virtual activity to anticipate user movement.

More specifically, monitoring module 104 may process data temporal patterns of the gaze direction of the user to identify a certain pattern, and compare the identified pattern with one or more reference patterns indicative of various respective user activities (e.g. reading, staring, gaming or others) to determine a matching pattern. Upon determining a matching pattern, the user engagement monitoring module determines whether the identified pattern corresponds to the user engagement with virtual content presented to him, and activates the module accordingly.

Figure 2:
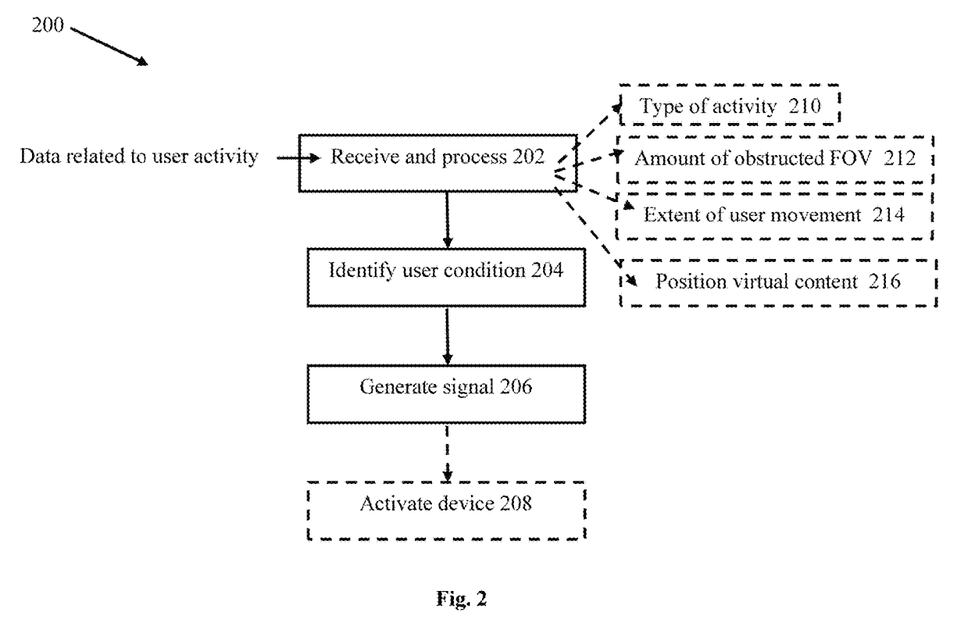
FIG. 2 is a schematic flow chart illustrating the main procedures of the method of some embodiments of the presently disclosed subject matter.

Certain processing steps are described and a particular order of processing steps is disclosed; however, the sequence of steps is not limited to that set forth herein and may be changed as is known in the art, with the exception of steps or acts necessarily occurring in a certain order. Reference is made to FIG. 2, showing a flow chart illustrating a method for indicating AR user activity. The flow chart or any process or method described herein in other manners may represent a module, segment, or portion of code that includes one or more executable instructions to implement the specified logic function(s) or that includes one or more executable instructions of the steps of the progress. Although the flow chart shows a specific order of execution, it is understood that the order of execution may differ from that which is depicted. For example, the order of execution of two or more boxes may be scrambled relative to the order shown. Method 200 includes receiving and processing data related to user activity in 202; identifying whether the user is in a certain user condition corresponding to a certain social relevant parameter in 204; and generating at least one signal being indicative of at least one social relevant parameter related to a user activity to an onlooker in 206. The signal may be transmitted to an indicator device being activated upon receipt of this signal in 208. Receiving and processing data related to user activity in 202 may include determining the type of user activity in 210 (e.g. listening to music, watching video, talking to someone).

For example, to identify the immersion condition of the user, receiving and processing data related to user activity in 202 may also include processing data indicative of virtual content presented to the user to determine an amount of user's field of view obstructed by virtual content in 212 and/or a correspondence between a 3D position of the virtual content and the gaze direction of the user in 216.

For example, to identify the space condition of the user, receiving and processing data related to user activity in 202 may also include identifying the type of activity in 210 (e.g. gaming) and anticipating extent of user movement in 214 based on the data being indicative of virtual content presented to the user to determine a space condition and on reference data patterns indicative of at least one user activity.

Reference is made to FIG. 3 illustrating a possible configuration of the indicator device of some embodiments of the presently disclosed subject matter 300. The three inset figures show different possible operating modes of indicator module 302. However, the invention is not limited to such operating modes. Although in the figure, monitoring module 304 is illustrated as being integrated in the AR wearable system (smart glasses), the invention is not limited to such configuration and monitoring module 304 may be placed in an environment distant from indicator module 302. Indicator module 302 and monitoring module 304 communicate via wires or wirelessly. In this specific and non-limiting example, indicator module 302 includes a plurality of units having a different number of symbols, each symbol having a different shape: one circular, three rectangles and four curved lines. Each symbol may generate a different color. As illustrated in the figure, for example, for indicating a recording activity, the round red light may blink. For example, for indicating an immersion condition, the blue rectangles may show how immersed the user is (e.g. none—no visible AR content; one rectangle—some; two—more than half of user's field of view obscured by AR content; three—user is in full VR mode). The same blue rectangles may also show whether the user is interacting with AR by temporarily becoming brighter (those that are on). For example, for indicating a focusing condition such as headphone activity, the green curvy lights may show the headphone activity with brighter light, meaning louder sound.

The invention claimed is:

1. An indicator device of user activity in Augmented Reality (AR), the indicator device comprising:
   an indicator module being configured and operable to be responsive to activation data to generate at least one signal being indicative of at least one social relevant parameter related to the user activity, to be observed by at least one user's onlooker, informing the at least one user's onlooker that the user is in a certain condition being engaged in an activity affecting user's movements;
   a monitoring module connectable to said indicator module, said monitoring module being configured and operable to communicate with an AR device of the user during the user's interaction with the AR content, and to receive and process data related to user's activity including data being indicative of virtual content presented to the user and data indicative of a gaze direction of the user over time, processing of said data comprising analyzing temporal patterns of a gaze direction of the user over time and upon identifying a matching pattern in relation to one or more reference patterns indicative of various respective user activities, determining that the user is in the certain condition of a space activity and, based on the determination of the space activity, anticipating extent of user's movement; and
   upon identification of the certain condition of the space activity of the user, generate the activation data to the indicator module.

2. The indicator device of claim 1, wherein the indicator module is operable in at least one of on/off, gradual operating mode and operating mode being indicative of the certain social parameter.

3. The indicator device of claim 2, wherein the gradual operating mode is indicative of a level of the user condition.

4. The indicator device of claim 1, wherein the indicator module is at least one of a visual indicator module or an auditory indicator module.

5. The indicator device of claim 1, wherein the monitoring module is configured and operable to process data indicative of the virtual content presented to the user and determine amount of user's field of view obstructed by said virtual content.

6. The indicator device of claim 1, wherein the monitoring module is further configured and operable to
   receive and process said data being indicative of the temporal patterns of the gaze direction of the user over time, to identify a correspondence between a 3D position of the virtual content and the gaze direction of the user.

7. The indicator device of claim 1, wherein the indicator module is further configured and operable to generate additional signals indicative of one or more additional types of the user activities.

8. The indicator device of claim 1, configured to be integrated in a wearable Augmented Reality device.

9. The indicator device of claim 1, wherein the monitoring module is configured and operable to control whether a permission for recording the data exists, and upon identification of such permission, the monitoring module is configured and operable to generate a recording signal and control access and storage of the recorded data.

10. A method for indicating AR user activity, the method comprising:
   receiving, data related to user activity comprising data indicative of virtual content presented to the user and data indicative of a gaze direction of the user over time;
   processing said data by analyzing temporal patterns of the gaze direction of the user over time to identify a matching pattern in relation to one or more reference patterns indicative of various respective user activities and thereby identify that the user is in a certain user condition of a space activity of the user; and
   anticipating extent of user movement and
      upon identification of the certain user condition, generating activation data indicative thereof; and
      in response to said activation data, generating at least one signal being indicative of at least one social relevant parameter related to the user activity, to be observed by an onlooker, thereby enabling the onlooker to be aware of the user activity.

11. The method of claim 10, further comprising generating at least one signal being indicative of the type of user activity.

12. The method of claim 10, wherein the generating of the at least one signal comprises at least one of (i) activating at least one of the following operating modes: on/off, and gradual operating mode being indicative of a certain social parameter or (ii) generating at least one visual or auditory signal.

13. The method of claim 12, wherein the gradual operating mode is indicative of a level of user condition.

14. The method of claim 10, wherein the processing of the data indicative of the virtual content presented to the user comprises determining an amount of user's field of view obstructed by the virtual content.

15. The method of claim 14, wherein the processing of said data further comprises:
   identifying a correspondence between 3D position of the virtual content and the gaze direction of the user.

16. The method of claim 10, further comprising differentiating between data for an operating system use and data for personal use and providing permission to an application to record personal data together with an indication to the surroundings that the user is recording for his personal use.

* * * * *